M. A. MALLOY.
KITCHEN RANGE AND COOKING STOVE.
APPLICATION FILED AUG. 20, 1910.

1,157,885.

Patented Oct. 26, 1915.
3 SHEETS—SHEET 2.

Witnesses:
O. Martin.
Marie E. Sutz

Inventor:
Mary A. Malloy.
by T. J. Geisler
Atty.

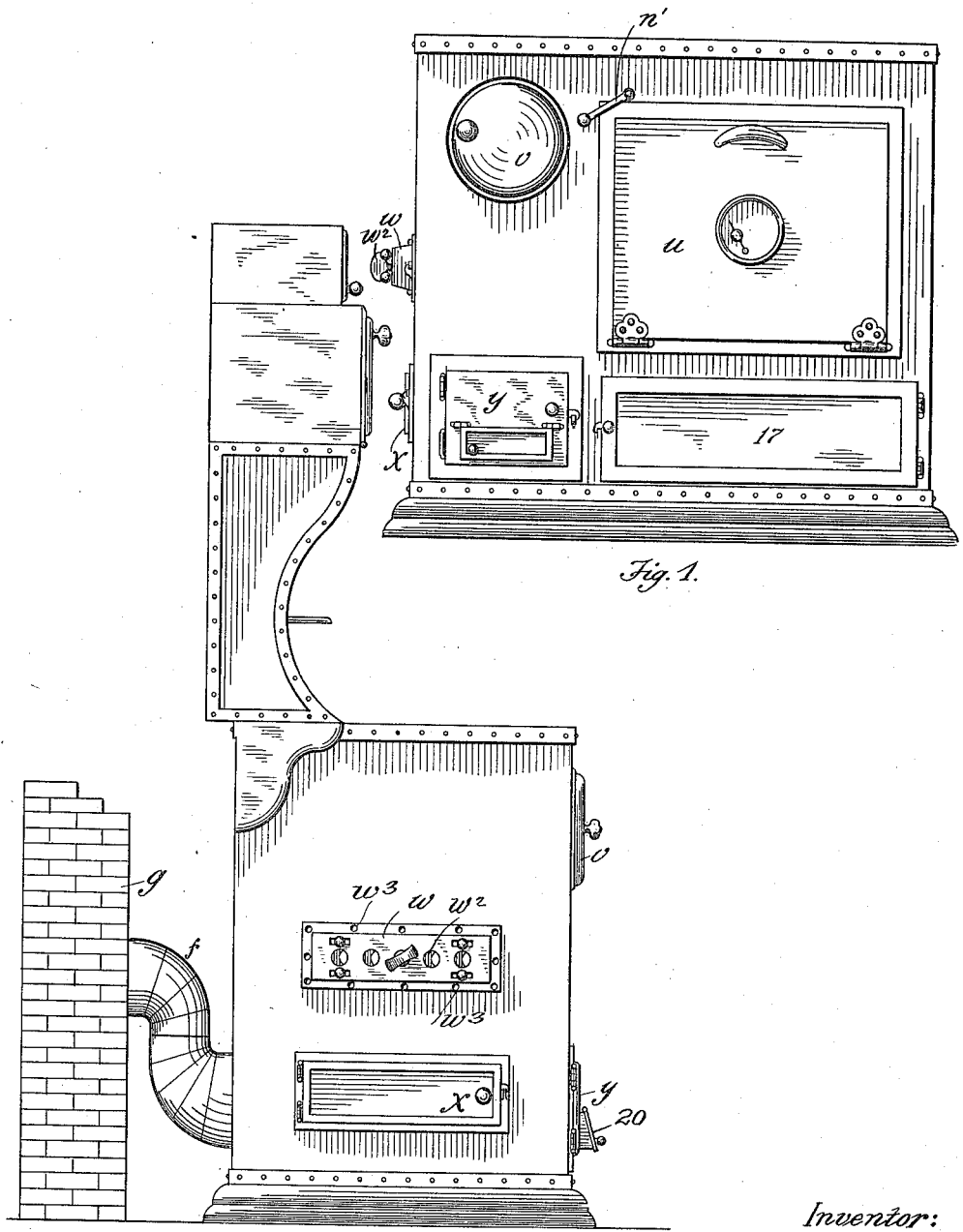

UNITED STATES PATENT OFFICE.

MARY A. MALLOY, OF PORTLAND, OREGON, ASSIGNOR, BY MESNE ASSIGNMENTS, TO GRACE HUDSON.

KITCHEN-RANGE AND COOKING-STOVE.

1,157,885.       Specification of Letters Patent.       Patented Oct. 26, 1915.

Application filed August 20, 1910. Serial No. 578,253.

*To all whom it may concern:*

Be it known that I, MARY A. MALLOY, a citizen of the United States, and a resident of Portland, county of Multnomah, State of Oregon, have invented a new and useful Improvement in Kitchen-Ranges and Cooking-Stoves, of which the following is a specification.

This invention relates to kitchen ranges and cooking-stoves, and has for its object to embody in such ranges and stoves, in a practical and commercial manner, the certain improvements in furnaces heretofore invented by me and for which I filed application for Letters Patent of United States, July 21, 1910, Serial No. 573,109.

The nature and purpose of my present invention will be readily ascertained, after having become familiar with my said prior invention, by referring to the accompanying drawings constituting a part of this specification, the figures in such drawings representing as follows:—

Figure 3:
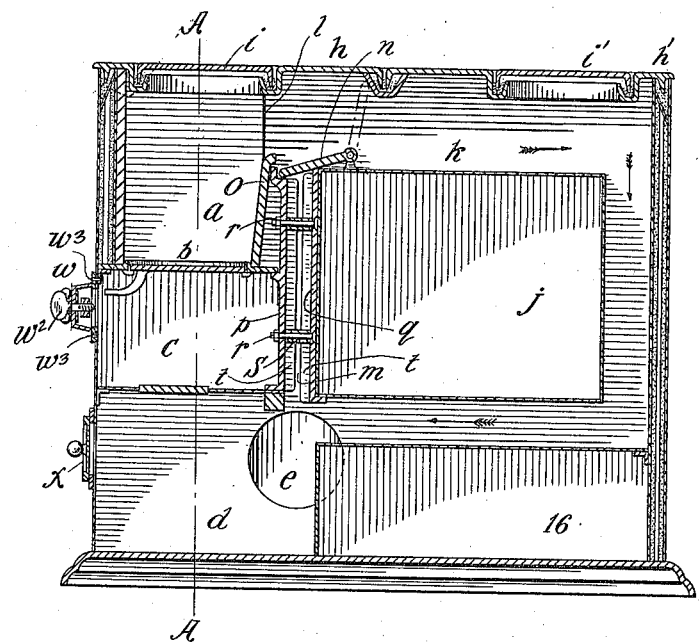
Figure 4:
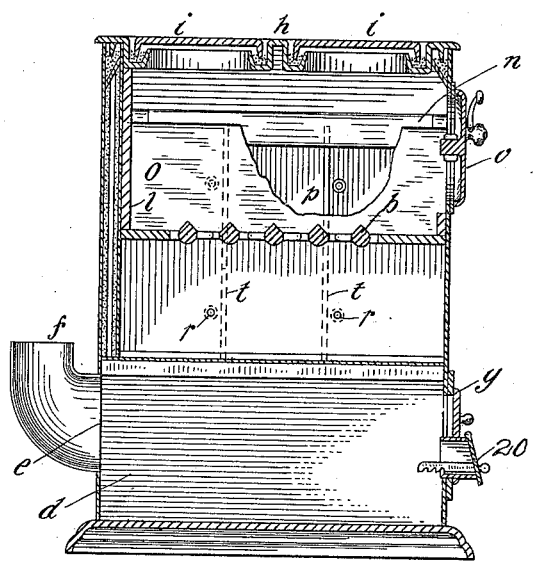
Figure 5:
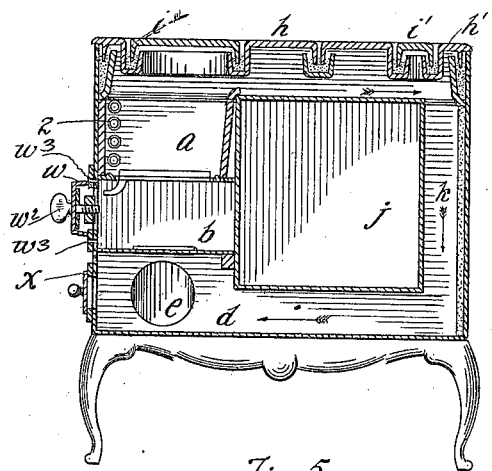
Figure 6:
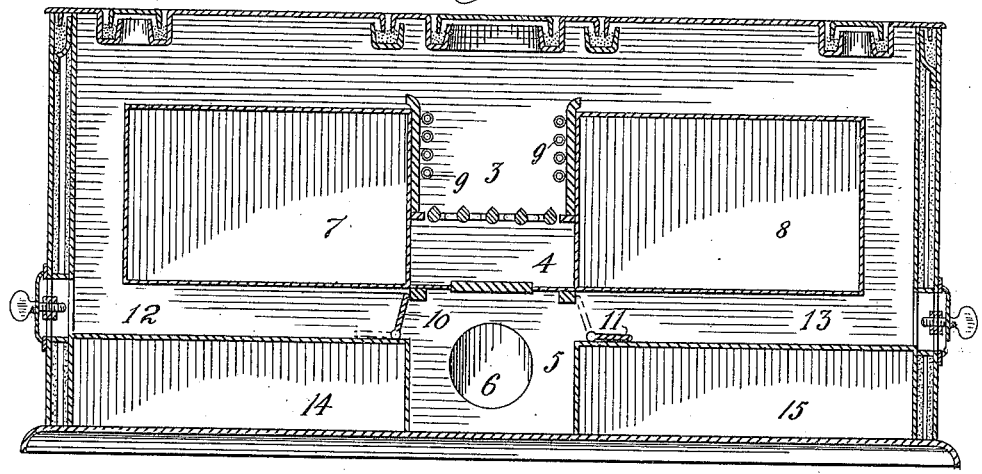
Figure 7:
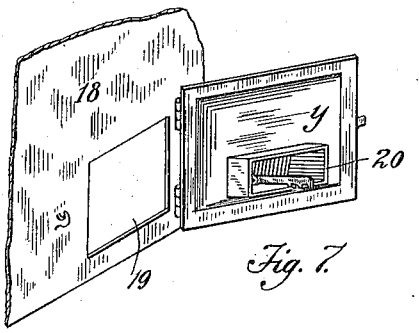

Figure 1 is a front elevation of a kitchen range embodying my present invention. Fig. 2 is a left-end elevation of such kitchen range. Fig. 3 is a longitudinal vertical section. Fig. 4 is a cross-section on a line A—A, of Fig. 3, with parts broken away as hereinafter described. Fig. 5 is a cross-section similar to that shown in Fig. 3, but illustrating a different form of the invention. Fig. 6 is a longitudinal vertical section of another embodiment of the invention. Fig. 7 is a perspective detail showing the lower left-hand portion of the kitchen range shown in Figs. 1 and 2, thus showing the air-inlet aperture through the wall of the draft-controlling chamber.

The type of kitchen range shown in Figs. 1 to 4 inclusive, is to represent in its outline one of the kind now commonly in use.

The letter $a$ indicates a combustion chamber, below the grated bottom of which is a draft-chamber $c$, and below the latter is a draft-controlling chamber $d$, having an opening $e$ with which the exit flue $f$ is connected, the latter leading to the stack $g$. The top of the range comprises removable main pieces $h$, $h'$ and lids $i$, $i'$, the flanges of the latter being seated in the depression in the removable top pieces to form airtight joints. The combustion chamber is sealed against the ingress of air above the grate to insure that air will only be admitted to the fuel through said grate.

My range is provided with a baking oven $j$, around which extends a main flue $k$, leading from the outlet $l$ of the combustion chamber $a$ in the direction pointed by the arrows, the main flue communicating with the draft controlling chamber $d$.

As shown in Fig. 3, the main flue extends from the combustion chamber around the oven $j$, to the draft-controlling chamber $d$. As illustrated in Fig. 3, $m$ is an auxiliary flue extending perpendicularly from the point of juncture of the main flue $k$ with the outlet $l$ of the combustion chamber $a$, directly to the juncture of the exit of the main flue and the draft controlling chamber $d$. A gate $n$ is pivoted in the main flue and may be swung to close either the main flue $k$ or the auxiliary flue $m$. With the gate arranged as in Fig. 3, the heated gases pass from the combustion chamber $a$ around the oven $j$ to the draft controlling chamber $d$, thus heating the oven $j$. When the latter is not to be used, and a quick fire is desired, the gate $n$ is lifted to its upright position, as shown in dotted outline, so as to close the main flue $k$ and open the more direct, auxiliary flue $m$. $o$ is a fire-back. The transverse wall $p$ is connected to the wall $q$, supporting one end of the oven $j$, by means of bolts $r$, the parts being separated by spacing-sleeves $s$; and the plates $p$, $q$ are reinforced by ribs $t$, the latter details of course being more or less of common construction. The oven $j$, is provided with a door $u$. $v$ is a fuel-door for introducing fuel into the combustion chamber $a$; $w$ is a gate for controlling the air admitted into the draft-chamber $c$; and in this gate is a damper $w^2$. In the door $w$ are openings $w^3$ arranged to at all times admit a minimum supply of air to the combustion chamber; $x$ is a door in the left end of the casing of the draft controlling chamber $d$ whereby to gain access to the latter; and $y$ is a combined door and damper for controlling the admission of air to the draft controlling chamber $d$. Parts not particularly described are to be taken as of common construction, except as otherwise set forth in my other application for Letters Patent above referred to.

The type of range shown by me in Fig. 5 is intended to be in all respects like that shown in the preceding figures, except in this instance my range is somewhat simplified, as may be deemed convenient for the smaller kind of ranges and cooking-stoves by the omission of the auxiliary flue $m$, shown in Fig. 3. Furthermore, in the construction shown in Fig. 5, no gate as $n$, shown in Fig. 3, is required, since the flue $k$ around the oven $j$ must be left open at all times. 2 in Fig. 5 represents a water-back. It is to be noted that in Fig. 5 the outlet $e$ to the flue of the stack is located entirely within the draft controlling chamber $d$. The particular location of such outlet, however, is immaterial, except that it must be confined to the draft controlling chamber $d$ to which chamber the flue $k$ is connected, and said flue having no other outlet, than through said outlet $e$.

In operation, fuel is introduced to the combustion chamber and the dampers $w^2$ and 20 are adjusted so as to make a direct draft to the exit flue. After the fuel becomes incandescent the damper $w^2$, is readjusted to reduce the supply of air, and the damper 20, is opened somewhat to admit a larger supply of air through the draft controlling chamber. The air passing through the draft controlling chamber intersects the products of combustion coming from the main flue, and is the means I employ to regulate the degree of combustion. Under all circumstances a minimum supply of air is admitted through the openings $w^3$ in the door $w$, so that even if the products of combustion should be entirely stopped by the draft in the draft controlling chamber, the unconsumed gases in the combustion chamber will not cause an explosion. By regulating the dampers $w^2$ and 20, the products of combustion are controlled and are retarded in the main flue. If it be desired to completely choke the fire, the gate $y$ is opened wide, and the inrushing air will prevent the gases escaping from the main flue to the draft controlling chamber.

In the type of range shown in Fig. 6, 3 represents the fire-box, 5 the draft-controlling chamber, 6 the outlet from the latter to the stack, 7 and 8 are baking ovens, 9 represents water heating coils in the fire-box 3, 10, 11 are gates controlling the passages 12, 13, leading from the fire-box 3 into the draft controlling chamber 5. By the adjustment of the dampers 10, 11, either or both of the ovens 7, 8, may be thrown into service or cut out, as desired. 14, 15, in Fig. 6 and 16 in Fig. 3, represent warming closets. 17 is the door of the warming-closet 16. Features shown but not described in Fig. 6 are to be understood as being the same as like features shown in the preceding views.

In Fig. 7 the wall-section 18 is provided with the air-inlet aperture 19, covered by the door $y$, for example, shown in Figs. 1, 2, and 4, said door provided with a gate-controlled inlet 20.

I claim:

1. In a range, the combination of a casing provided with a combustion chamber and a draft chamber which communicates with the combustion chamber and a draft controlling chamber below the draft chamber, a grate in the bottom of the combustion chamber, the combustion chamber being sealed against the ingress of air above the grate, an oven in the casing, said oven being spaced from the walls of the casing to provide a main flue, one end of the main flue communicating with the combustion chamber above the bed of fuel therein and the opposite end of the said main flue communicating with the draft controlling chamber, means for introducing a constant minimum supply of air and a regulated maximum supply of air to the draft chamber, an exit flue communicating with the draft controlling chamber at one side of the entrance thereto of the main flue and a damper for introducing a regulated supply of air through the draft controlling chamber to control the combustion in the combustion chamber the volume of air passing through the draft controlling chamber choking the products of combustion in the main flue and thereby controlling the combustion in the combustion chamber.

2. In a range the combination of a casing provided with a combustion chamber and a communicating draft chamber, and draft controlling chamber, a grate in the bottom of the combustion chamber, said combustion chamber being sealed against the ingress of air above the grate, an oven adjacent the combustion chamber and the draft chamber, a main flue surrounding the oven, one end of said main flue communicating with the combustion chamber above the bed of fuel therein and the opposite end of said main flue communicating with the draft controlling chamber below the draft chamber, a damper in the draft chamber for admitting a maximum supply of air to and through the body of fuel in the combustion chamber, there being openings in the draft chamber for introducing a constant minimum supply of air to and through the body of fuel, an exit flue communicating with the draft controlling chamber, the draft controlling chamber having an opening for the admission of air which is drawn through said chamber under the influence of the draft in the exit flue and which controls the draft in the main flue, a damper for regulating the air passing through said opening, and a damper for admitting an excess of air in said opening to entirely cut off the draft entering the draft chamber.

3. In a range, the combination of a casing provided with a combustion chamber and a communicating draft chamber and a draft controlling chamber, a grate in the bottom of the combustion chamber, said combustion chamber being sealed against the ingress of air above the grate, an oven supported in and spaced from the walls of said casing to provide a main flue which communicates with the combustion chamber above the level of the fuel therein and the draft controlling chamber, one wall of said oven being spaced from the combustion chamber and the draft chamber to form an auxiliary flue which communicates with the top and bottom of the main flue, a hinged damper at the top of the auxiliary flue to direct the products of combustion through the main flue or said auxiliary flue to the draft controlling chamber, means in the draft chamber for admitting thereto a regulated maximum supply of air which passes to and through the body of the fuel there being openings in the draft chamber for admitting a constant minimum supply of air thereto which passes to and through the body of fuel, an exit flue communicating with the draft controlling chamber, a damper for admitting a regulated supply of air to the draft controlling chamber said air being drawn through the said chamber under the influence of the draft in the flue whereby to control the draft in either the main or the auxiliary flues to hold the products of combustion in suspension in said flues and the combustion chamber.

4. In a range the combination of a combustion chamber, a grate in the bottom of the combustion chamber, the combustion chamber being sealed against the ingress of air above the grate, a draft chamber which communicates with the combustion chamber, a draft controlling chamber, an oven, a main flue formed around the oven and communicating with the combustion chamber above the level of the fuel and the draft controlling chamber, the draft chamber having an opening, a damper coöperating with said opening to admit a maximum supply of air to and through the body of fuel, said damper having openings for the admission of a constant minimum supply of air to and through the body of the fuel, an exit flue communicating with the draft controlling chamber at one side of the entrance thereto of the main flue, said draft controlling chamber having an opening opposite the exit flue, a damper for said latter opening, the size of the opening being proportioned to the size of the mouth of the exit flue and the opening in the draft chamber so that when the damper in the draft controlling chamber is wide open the draft in the main flue will be cut off.

5. In a range, the combination of a casing provided with a combustion chamber and a draft chamber which communicates with the combustion chamber and a draft controlling chamber, a flue formed in the casing, said flue communicating with the combustion chamber above the bed of fuel therein and the draft controlling chamber, a grate in the bottom of the combustion chamber, said combustion chamber being sealed against the ingress of air above the grate, means for introducing a constant minimum supply of air and a regulated maximum supply of air to the draft chamber, an exit flue communicating with the draft controlling chamber, and a damper for introducing a regulated supply of air through the draft controlling chamber to control the combustion in the combustion chamber, the volume of air passing through the draft controlling chamber holding the products of combustion back in the flue and the combustion chamber, the minimum and maximum supply of air serving to promote the combustion while same are being held back.

MARY A. MALLOY.

Witnesses:
W. P. ANDRUS,
GEO. W. MORGAN.

Copies of this patent may be obtained for five cents each, by addressing the "Commissioner of Patents, Washington, D. C."